United States Patent [19]
Hubscher

[11] 3,709,661
[45] Jan. 9, 1973

[54] IGE ($\gamma$E) SENSITIVE IMMUNODIFFUSION PLATE

[76] Inventor: Thomas Hubscher, 2444 Benny Crescent, Apt. 409, Montreal, Quebec, Canada

[22] Filed: Dec. 24, 1970

[21] Appl. No.: 101,364

[52] U.S. Cl. .................23/253 R, 23/230 B, 252/408
[51] Int. Cl. ..........................G01n 33/16, C12k 1/06
[58] Field of Search..23/230 B, 253; 195/103.5, 127; 424/12; 252/408

[56] References Cited

UNITED STATES PATENTS

| | | | |
|---|---|---|---|
| 3,378,481 | 4/1968 | Saravis et al. | 23/230 B |
| 3,389,966 | 6/1968 | Saravis | 23/230 B |
| 3,554,704 | 1/1971 | Ushakoff | 23/230 B |

OTHER PUBLICATIONS

Mancini et al., Immunochemistry, 1965 Vol. 2, pp. 235–254.

*Primary Examiner*—Morris O. Wolk
*Assistant Examiner*—R. E. Serwin
*Attorney*—Raymond A. Robic

[57] ABSTRACT

A sensitive immunodiffusion plate for the quantitation of IgE ($\gamma$E) in human serum and other biological fluids, with the lower limit of sensitivity at 300 ng/ml and an accurate detection range of 0.045 – 0.25 mg % (450–2,500 ng/ml) protein. The immunodiffusion plate has the following geometrical proportions:

$$\frac{h \text{ (thickness of the gel)}}{D \text{ (diameter of well)}} = 0.22 \ (+0.03) \text{ max.}$$

A 1 percent agarose solution including a borate buffer, sodium citrate and glycine is used for the preparation of the gel. Fetal calf serum is incorporated as diluent for the antisera.

22 Claims, 4 Drawing Figures

IGE (γE) SENSITIVE IMMUNODIFFUSION PLATE

The present invention relates to an immunoglobulin E sensitive immunodiffusion plate. More particularly, the invention is directed to a new agarose gel and a method of preparing the same, as well as to a new immunodiffusion plate incorporating this new agarose gel and a method of preparing it, all for the quantitation of immunoglobulin E in human serum and other biological fluids. Specifically the present invention relates to a method for the quantitation of extremely small amounts of immunoglobulin E.

The process of immunity in man and most animals is associated with a complex group of proteins known collectively as gamma globulins (abbreviated: γ-globulins) or immunoglobulins (abbreviated: Ig). These proteins are concentrated mainly in the serum and plasma and in addition can be found in other biological fluids such as: urine, saliva, colostrum, tears, spinal fluid, nasal and bronchial secretions.

Like many physiological parameters, the presence and concentrations of immunoglobulins are controlled by a wide variety of factors, some which are inherited, others influenced by environmental conditions, mainly diseases. Mean "normal" values (concentrations) for the immunoglobulins present in serum or plasma are well established. Fluctuations from these normal values are clinically significant and given special attention in the diagnosis and therapy of various deseases.

Until 1967, four distinct classes of immunoglobulins were recognized in the human serum: IgG (γG), IgA (γA), IgM (γM), and IgD (γD). A fifth class of immunoglobulin designated as IgE (γE) was then added to the list. The concentration of IgE (γE) in the human serum is very low, its mean value in healthy adults being 0.02 milligrams percent, with confidence limits ranging from 0.006 to 0.08 mg %. While the significance of IgE (γE) is not fully understood, elevated levels are found in allergic conditions in general, various parasitic infections and certain liver diseases.

The immunoglobulins can be quantitated by a variety of immunochemical methods, most of them time consuming and requiring sophisticated equipment and expensive materials.

The most widely employed method to-day is the single-radial immunodiffusion technique published in the scientific literature by Mancini et al. (MANCINI G., VAERMAN, J.P., CARBONARA A.O. and HEREMANS, J.F., Protides, Biol. Fluids 11,370, 1964) and (MANCINI G., CARBONARA, A.O. and HEREMANS, J.F., Immunochemistry 1965, vol. 2, pp. 235-254) and its modifications as published by FAHEY (FAHEY, J.H. and McKELVEY, E.M., The Journal of Immunology 1965, vol. 94, pp. 84-90) or AUGENER (AUGENER, W., Protides Biol. Fluids, 12,363, 1964).

The principle of the single-radial immunodiffusion technique of Mancini is explained as follows: If an unknown amount of protein (antigen) is allowed to diffuse radially from a well in a uniform layer of antiserum (antibody) containing gel (agar) for a time sufficient to allow all antigen to combine, the final area reached by the precipitate is directly proportional to the amount of antigen and inversely proportional to the concentration of antibody. In other words, a test sample containing a certain protein (immunoglobulin) placed in a well of antibody (anti-immunoglobulin antiserum) containing agar gel, diffuses into the agar and forms a precipitin ring. The ring diameter is related to the concentration of the immunoglobulin in the test sample.

The principle and method of the single-radial immunodiffusion technique is being utilized (for a variety of serum proteins and of the four immunoglobulins: IgG (γG), IgA (γA), IgM (γM) and IgD (γD) ) in the following commercially available test plates:

*Immunoplates* - trademark, Hyland Laboratories, Los Angeles, Calif.

*Partigen - trademark, Immunodiffusion Plates*, Behringwerke, A.G., Marburg, Lahn, Germany.

*Quantitative Immunodiffusion Plates*, Melpar Inc., Falls Church, Va.

*Quanti-Plate, Kallestad Laboratories Inc.*, Minneapolis, Minn.

The performance of the actual test of quantitation is almost identical for each plate, regardless of the supplying company. Microsyringes, or capillary pipets are used to fill the wells in the agar plates with samples to be tested. At least three different standards (samples with known concentrations of the protein to be determined) are included per plat. The plates are then left in a moisture chamber, until optimal precipitation rings are obtained. (The time and temperature of incubation varies for each individual protein). Diameters of precipitin rings obtained are measured with lateral illumination against a dark background, using a measuring microscope, graduated magnifying lens or measuring template. If necessary, faint ring diameters can be intensified either by immersing the plates in 2 percent acetic acid or following appropriate washing (24-48 hrs) and drying, staining with specific stains such as Amido-Black.

A standard calibration curve is constructed on a semilogarithmic paper by plotting the ring diameters of the three standard samples of the arithmetic (horizontal) scale against their corresponding concentrations on the logarithmic (vertical) scale and drawing the best straight line between the three points. The concentrations of the unknown samples are determined by referring to the calibration curve.

While the performance of the test is identical, the preparation of the plates can vary from one company to another in as much as the size and form of the plate, the number of samples which can be tested per plate, the thickness of the agar gel layer and the exact ingredients and their precise amounts making up the specific agar gel layer. However, general rules as first described by Mancini and later modified by Augener and Fahey respectively are being followed.

Purified agar in a concentration of 3 percent is dissolved by heating in a buffer (usually diethylbarbiturate 0.1 M pH 8-8.6). A preservative such as 0.1 percent thimerosal is added. The agar solution is then cooled to around 56°-50° C. and mixed with an equal volume of the specific antiserum. (The exact dilutions of the antiserum are determined experimentally). Transparent plastic molds (plates) are warmed to approximately 56°-60 C. and placed on a precisely leveled surface, and filled with the warm agar gel - antiserum mixture. The solution is evenly distributed over the entire surface (allowing to a uniform gel thickness of usually 1-2 mm.). After the gel has solidified at room temperature, holes of uniform size (usually 1–2 mm.) are punched and cuttoff from the gel. The plates are then covered with a lid and stored in a moisture chamber at +4° or +5° C.

As mentioned, immunodiffusion plates prepared according to the method described are available for the quantitation of IgG ($\gamma$G), IgA ($\gamma$A), IgM ($\gamma$M), and IgD ($\gamma$D). However, no immunodiffusion plate is available for the quantitation of IgE ($\gamma$E). The reason being that neither the basic ingredients nor the geometry are adequate to prepare such a sensitive plate as it is required for the quantitation of IgE ($\gamma$E).

While other techniques are available for the quantitation of IgE ($\gamma$E) in human serum and other biological fluids, they make use of radio-active materials, thus being difficult to perform in most of the laboratories not especially equipped to handle radio-active materials.

It is an object of the present invention to provide a method for rapid and routine laboratory quantitation of IgE ($\gamma$E) in human serum and other biological fluids.

It is another object of the invention to provide a method in which no radio-active materials are necessary.

It is another object of the invention to provide a sensitive immunodiffusion plate for the quantitation of IgE ($\gamma$E) in human serum and other biological fluids.

Another object of the invention is the design of a sensitive immunodiffusion plate with the lower limit of sensitivity at 300 ng/ml and an accurate detection range of 0.045 –0.25 mg % (450–2,500 ng/ml) protein.

Still another object of the invention is the design of an immunodiffusion plate with new geometrical proportions.

It is another object of the invention to provide a 1 percent agarose solution for the preparation of the gel.

Yet another object of the invention is the incorporation of fetal calf serum as diluent for the antisera.

In accordance with the invention, by modifying both the ingredients and the geometry, there is obtained a new plate which allows the quantitation of extremely small amounts of proteins and which is designed for the quantitation of IgE ($\gamma$E) in human serum and other biological fluids.

These and other objects can be attained by preparing an agar gel which comprises forming a borate buffer having a pH of about 8.5, adding sodium citrate and glycine to the borate buffer, heating the mixture until complete dissolution, and while continuously heating, adding agarose until the latter is completely dissolved.

The borate buffer preferably comprises boric acid, sodium borate and sodium chloride all in solution in water, for example as a 0.1 molar solution.

In accordance with the invention, the plate is prepared by pouring the agarous gel to which an antiserum has been added, into a plate made of transparent plastic, allowing the gel to solidify, forming wells of uniform size and volume in the gel, the ratio between the thickness of the agar gel layer (h) and the diameter (D) of the wells being kept at a maximum of 0.22 (+0.03).

The invention will now be illustrated by means of the following non-limiting examples.

In the drawings which illustrate the invention,

EXAMPLE 1

Figure 1:
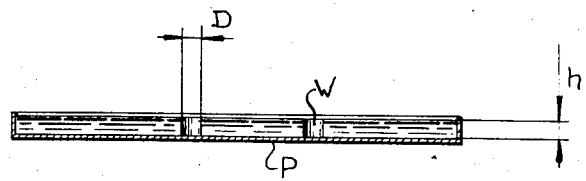
FIG. 1 is a cross-section view of an IgE ($\gamma$E) sensitive immunodiffusion plate according to the invention.
Figure 2:
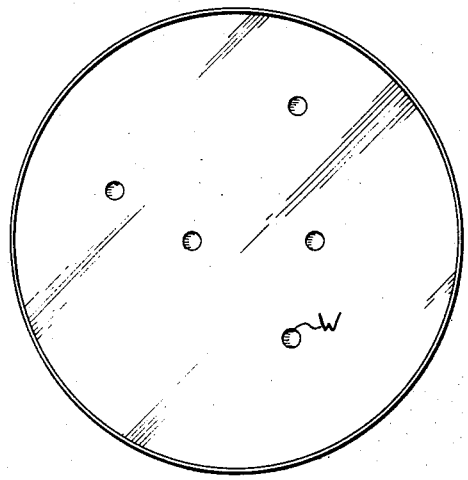
FIG. 2 is a plan view of the plate illustrated in FIG. 1.

Preparation of gel — 1 percent agarose

A borate buffer 0.5 M pH 8.5 (stock solution) is prepared by dissolving the following ingredients in 1 liter of distilled water:

30.91 g boric acid ($H_3BO_3$) F.W. 61.83

47.68 g sodium borate ($Na_2B_4O_7 \cdot 10\ H_2O$) F.W. 381.37

21.92 g sodium chloride (NaCl) F.W. 58.44

The pH is adjusted to 8.5 with 0.1 N HCl or 0.1 NaOH.

One part of stock solution is then diluted with four parts of distilled water giving a working solution of 0.1 M borate buffer pH 8.5.

Boil the 0.1 M borate buffer pH 8.5 and add reagents in the following order:

0.01 M (2.941 g/liter) sodium citrate ($Na_3C_6H_5O_7 \cdot 2H_2$) F.W. 294.11

0.01 M (0.750 g/liter) glycine (amino-acetic acid, amonia free) F.W. 75.07

Boil gently until completely dissolved then add 1 percent (10 g per liter) agarose (low-ion), continue to boil gently until agarose is completely dissolved. (The solution must be transparently clear).

For storage, the agarose is poured into suitable glass containers which have been thoroughly cleaned and eventually sterilized. Cover and store at +5° C.

EXAMPLE 2

Preparation of agarose-antiserum mixture

The desired amount of the solidified 1 percent agarose-gel is melted by placing the agarose containing flask in boiling water. The flask is transferred afterwards to a thermostatic controlled water bath and kept at 56° C. Since the antibody content of various antisera, raised in different animals, or even in the same animal at different times, varies a great deal, the precise dilution of the antiserum to be incorporated in the agarose-gel has to be worked out experimentally for each new batch of antiserum. However, as a guide line, with an antiserum to human IgE having a specific antibody content ranging from 0.25 to 0.50 mg/ml, dilutions of 1/200, 1/250, 1/300 and 1/450 should be assayed. With such an antiserum preparation, a dilution of 1/250 was found to be optimal. With more potent antisera, containing higher titers of specific antibody, higher dilutions should be considered.

The specific antiserum (anti-IgE) is to be diluted as follows:

An initial dilution is made in fetal calf serum (sterile):

If a final dilution of 1/250 is to be employed, then 1 part of specific antiserum is mixed with 24 parts of fetal calf serum — this gives a dilution of 1/25. If a dilution of 1/300 is to be employed, then 1 part of antiserum is mixed with 29 parts of fetal calf serum, etc. This initial dilution is then brought to 56° C. in a thermostatic controlled water bath at 56° C. After both the antiserum and the agarose have reached the desired temperature, 1 part of the diluted antiserum is thoroughly mixed with 9 parts of 1 percent agarose. In this way, if the initial antiserum dilution was 1/25, the final dilution now is 1/250.

EXAMPLE 3

Preparation of the agarose-gel-antiserum plate

The hot agarose-antiserum mixture is poured (with the aid of a warm pipet) into clean plates P made of transparent plastic. The volume of the agarose-gel-antiserum to be delivered per plate P depends On the total surface area of the plate P. The surface area in its turn can vary with the number of wells W to be punched.

After solidification of the gel (10–20 min.), circular wells W are punched in the gel with the aid of a tubular cutter having sharp edges. The gel is then removed from the punched areas by suction, so that wells W of uniform size and volume are obtained throughout the agarose-gel. The plate P which is ready now is covered with a lid and kept in a moisture chamber at +5° C. until needed.

The most important criteria to be considered in the preparation of the plate P is to keep the ratio between the thickness of the agarose-gel layer (h) and the diameter (D) of the wells at maximum of 0.22 (+0.03); $h/D = 0.22 (+.03)$ maximum.

Preferably the thickness of the agarose-gel layer should not be less than $0.80 \pm 0.05$ mm., therefore the wells' diameters should not be less than $3.2 \pm 0.2$ mm.

Optimal results are obtained when the thickness of the gel is $1.1 \pm 0.05$ mm. and the well diameter is $5.0 \pm 0.1$ mm.

The 5.0 mm. wells punched into an agarose gel layer of 1.1 mm thickness, will accommodate a volume of $21 \pm 0.5$ microliters.

The minimum distance between the centers of two adjacent wells should be at least 2.5 to 3 times greater than the diameter of each well, so that no confluence of two areas of precipitates should occur.

EXAMPLE 4

Performance of the test

A capillary pipet is used to fill the wells W in the agarose-gel layer with equal volumes of samples to be tested. At least three different standards (with known amounts of IgE) should be tested in each plate P. The remaining wells W are filled with the samples to be analyzed.

The plates are then incubated in a moisture chamber at 37° C. for 48 hours. Results can be read after 24 hours also, however, after 48 hours the precipitates formed are more distinct and their ring diameters can be determined much easier.

The diameters of the precipitin rings are measure as usual with lateral illumination against a dark background, using a measuring microscope or a graduated magnifying lens.

If desired, though not necessary, the precipitates can be intensified by the usual methods, i.e., immersing the plates in 2 percent acetic acid for 3 minutes, or after appropriate washing (in physiological saline for 12–24 hours and distilled water for 12–24 hours), and drying, staining with either 1 percent amido-black or 0.1 percent thiozine red.

The diameters of the standards are plotted on a two cycle semi-logarithmic paper against their known IgE concentrations and the standard calibration curve is obtained by connecting the points. The unknown IgE concentrations in the test samples are determined in the usual way, by referring to the standard curve.

Figure 3:
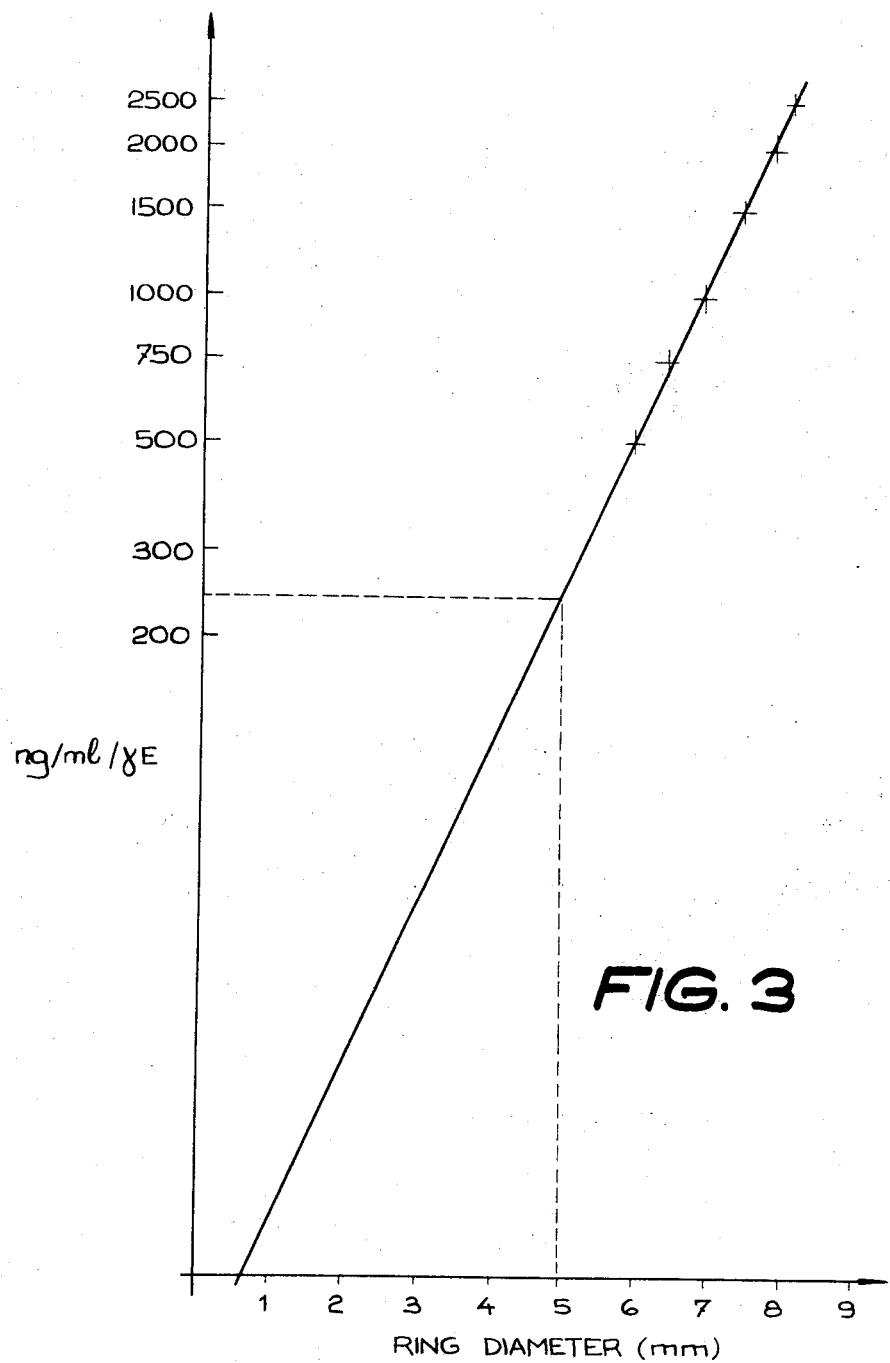
FIG. 3 represents the calibration curve obtained with standards in an agarose plate, having a thickness of 1.1 mm. and well diameters of 5.0 mm, i.e., $h/D = 0.22$.
Figure 4:
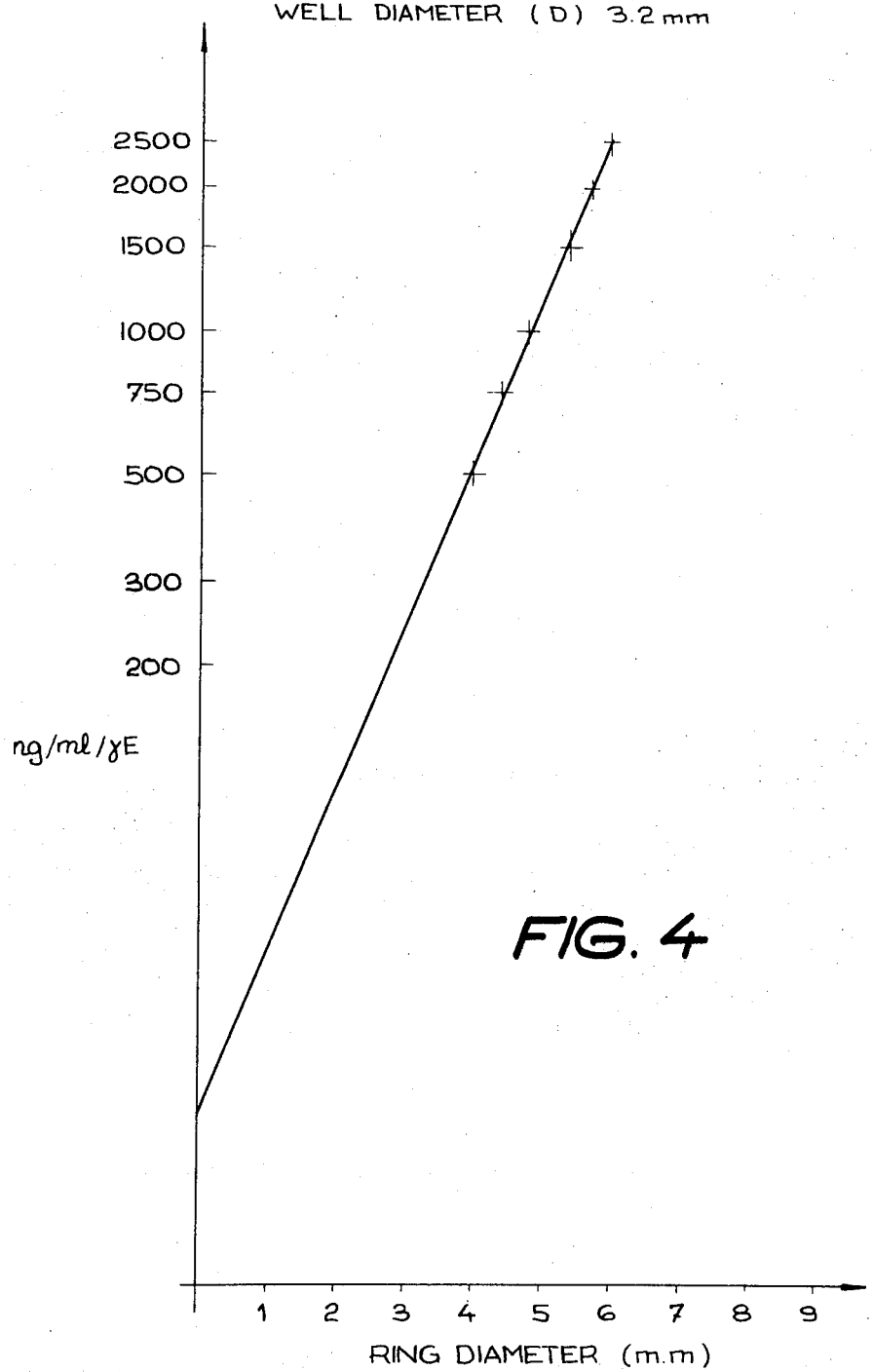
FIG. 4 represents the calibration curve for the same standards in an agarose plate of 0.80 mm thickness and well diameters of 3.2 mm, i.e., $h/D = 0.25$.

Two typical calibration curves obtained with 6 known standards, i.e.: 2,500 ng/ml, 2,000 ng/ml, 1,500 ng/ml, 1,000 ng/ml, 750 ng/ml and 500 ng/ml IgE ($\gamma$E) respectively, are illustrated in the graphs of FIGS. 3 and 4.

Graph of FIG. 3 represents the calibration curve obtained with the above mentioned standards in an agarose plate P, having a thickness of 1.1 mm. and well diameters of 5.0 mm.

Graph of FIG. 4 represents the calibration curve for the same standards in an agarose plate P of 0.80 mm. thickness and well diameters of 3.2 mm.

Both calibration curves are straight up till 2,500 ng/ml IgE, and unknown samples with IgE ($\gamma$E) concentration ranging between 450 ng to 2,500 ng/ml can be determined accurately. Samples with IgE ($\gamma$E) exceeding 2,500 ng/ml (i.e., giving ring diameters bigger than that of the 2,500 ng/ml standard) should be diluted accordingly (1/2 – 1/8) for accuracy, since above this concentration, the curve ceases to be linear. From a theoretical point of view, quantities as low as 280 ng could be determined in an agarose plate having a thickness of 1.1 mm. and well diameters of 5.0 mm. As illustrated in graph no. 3, any ring diameters exceeding 5.2 mm. could be quantitated, however, it was found experimentally that for maximum accuracy, the minimal ring diameter which allows to precise quantitation should be at least 5.6 – 5.7 mm. Therefore, the lower limit of sensitivity of the plate was established at 450 ng/ml IgE ($\gamma$E). In plates with a thickness of 0.80 mm. and well diameters of 3.2 mm., the lower limit of sensitivity was established on the same criteria at 480 ng/ml.

I claim:

1. A method of preparing an agarose gel to be used in an analytical immunodiffusion plate which comprises:
   a. forming a borate buffer having a pH of about 8.5,
   b. adding sodium citrate and glycine to said borate buffer,
   c. heating the mixture until complete dissolution, and
   d. while continuously heating adding agarose and causing the agarose to be completely melted under heat to form a transparently clear solution.

2. A method according to claim 1, wherein said borate buffer comprises boric acid, sodium borate and sodium chloride all in solution in water.

3. A method according to claim 2, wherein said borate buffer is 0.1 M.

4. A method according to claim 3, wherein said borate buffer, said sodium citrate and said glycine are used in a 1:0.1:0.1 molar ratio.

5. A method according to claim 4, which comprises adding 1 percent by weight agarose.

6. An agarose gel to be used in an analytical immunodiffusion plate which comprises:
   a. a borate buffer having a pH of about 8.5;

b. sodium citrate;
c. glycine; and
d. agarose.

7. An agarose gel according to claim 6, wherein said buffer comprises boric acid, sodium borate, sodium chloride and water.

8. An agarose gel according to claim 7, wherein said buffer is 0.1 M.

9. An agarose gel according to claim 6, wherein the molar ratio of the borate buffer: sodium citrate : glycine is 1:0.1:0.1.

10. An agarose gel according to claim 7, wherein said agarose amounts to about 1 percent by weight of said gel.

11. A composition comprising the agarose gel defined in claim 6, in admixture with an antiserum to human immunoglobulin E.

12. A composition according to claim 11, which comprises fetal calf serum as diluent for said antiserum.

13. Method of preparing an agarose-antiserum mixture which comprises heating the 1 percent agarose gel according to claim 10 to a temperature of about 56° C., separately mixing 1 part of a specific antiserum with about 24 to 29 parts of fetal calf serum to obtain a dilution between about 1/250 to 1/300, heating the resulting solution to a temperature of about 56° C., and mixing about 1 part of diluted antiserum with about 9 parts of said 1 percent agarose gel.

14. In a method of preparing an immunodiffusion plate adapted for the quantitation of immunoglobulin E and other biological substance in human serum and in other biological fluids selected from the group consisting of plasma, urine, saliva, colostrum, tears, spinal fluid, and nasal and bronchial secretions wherein a gel is allowed to solidify and wells of uniform size and volume are formed in said gel, the improvement which comprises pouring an agarose gel composition according to claim 12 into a plate made of transparent plastic, the ratio between the thickness of the agarose gel layer (h) and the diameter of the wells being kept at a maximum of 0.22 (+0.03).

15. A method according to claim 14, which comprises forming a layer of agarose gel of 1.1 ± 0.05 mm thick and wells diameter of 5.0 ±0.1 mm.

16. A method according to claim 14, which comprises forming a layer of agarose gel not less than 0.80 ±0.05 mm and wells diameters not less than 3.2 ± 0.2 mm.

17. A method according to claim 14, wherein the maximum distance between the centers of two adjacent wells is at least 2.5 to 3 times greater than the diameter of each well.

18. An immunodiffusion plate adapted for the quantitation of immunoglobulin E and other biological substance in human serum and other biological fluids wherein said plate is made of transparent plastic, and wells of uniform size and volume are formed in a layer of agarose gel in said plate, characterized by the fact that said layer of agarose gel comprises a composition according to claim 12, said agarose gel consisting of a borate buffer, having a pH of about 8.5, sodium citrate, glycine and agarose, the ratio between the thickness of the agarose gel layer (h) and the diameter of the wells being kept at a maximum of 0.22 (+0.03).

19. An immunodiffusion plate according to claim 18, wherein said layer of agarose gel is about 1.1 ± 0.05 mm thick and said wells have a diameter of about 5.0 ± 0.1 mm.

20. An immunodiffusion plate according to claim 18, wherein said layer of agarose gel is not less than 0.80 ± 0.05 mm and the diameter of said wells is not less than 3.2 ± 0.02 mm.

21. An immunodiffusion plate according to claim 18, wherein the maximum distance between the centers of two adjacent wells is at least 2.5 to 3 times greater than the diameter of each well.

22. A method for the quantitation of extremely small amount of immunoglobulin E and other biological substance selected from the group consisting of plasma, urine, saliva, colostrum, tears, spinal fluid, and nasal and bronchial secretions with the immunodiffusion plate according to claim 18 which comprises:
  a. filling at least three wells with equal volumes of three different standards containing known amounts of said biological substance,
  b. filling the remaining wells with equal volumes of samples to be analyzed,
  c. incubating the resulting plate in a moisture chamber at about 37° C. for about 48 hours until precipitin rings develop,
  d. measuring the diameters of the precipitin rings,
  e. plotting the diameters of the standard samples on a two cycle semi-logarithmic paper against their known concentrations to obtain a standard curve, and
  f. determining the unknown biological substance concentrations in the samples to be analyzed by referring to the standard curve.

* * * * *